(No Model.)
T. ERHARD.
GALVANIC BATTERY.
No. 346,032. Patented July 20, 1886.
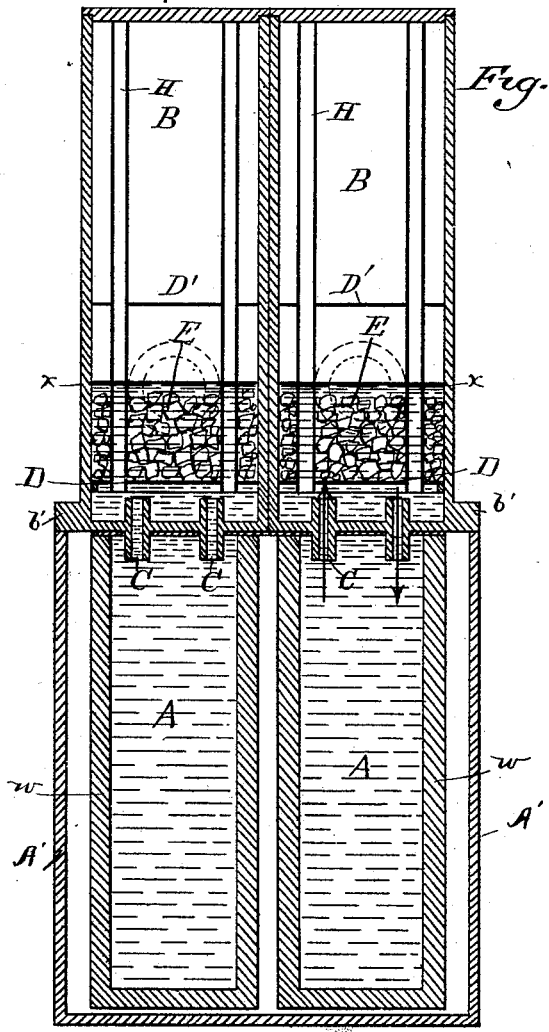
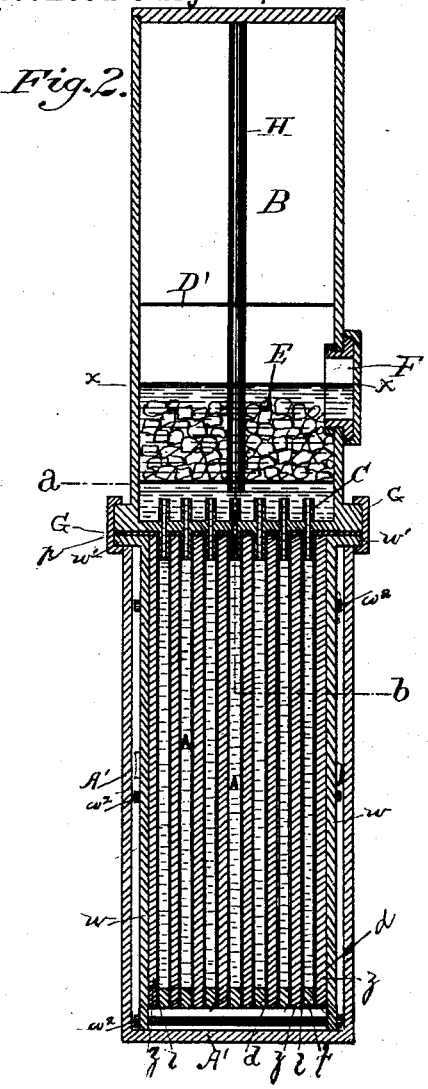
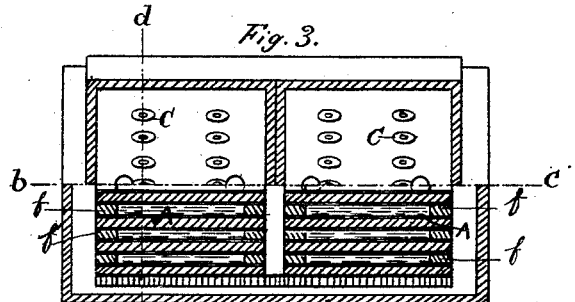
Attest:
J. A. Hurdle
E. Leibwright
Inventor:
Theodor Erhard,
by Brustlein Pury & Co.
Attys.

UNITED STATES PATENT OFFICE.

THEODOR ERHARD, OF STUTTGART, WÜRTEMBERG, GERMANY.

GALVANIC BATTERY.

SPECIFICATION forming part of Letters Patent No. 346,032, dated July 20, 1886.

Application filed September 10, 1885. Serial No. 176,745. (No model.)

*To all whom it may concern:*

Be it known that I, THEODOR ERHARD, a citizen of Germany, residing at Stuttgart, Würtemberg, Germany, have invented certain new and useful Improvements in Galvanic Batteries, of which the following is a specification.

My invention relates to a novel construction of a galvanic battery, whereby the best possible effect may be produced without the employment of acids.

The invention will first be described with reference to the drawings, and then pointed out in the claims.

Figure 1 represents a vertical sectional view of my improved battery, taken on the line $b\ c$ of Fig. 3. Fig. 2 is a similar sectional view taken on the line $d\ e$ of Fig. 3. Fig. 3 is a transverse sectional view taken on the line $a\ b$ of Fig. 2.

In the drawings, the letter A indicates the elements of the battery, which are grouped together after the manner of a voltaic pile, and are combined and arranged as follows: Upon a wooden plate, $w$, I place a zinc plate, $z$, to which is attached a negative polar wire. (Not shown.) Upon the zinc plate I place a diaphragm, $d$, of parchment-paper, and upon this the insulating-frame $f$, made of pressed cork or papier-maché. Upon this frame I place a leaden sheet, $l$, connected with a zinc plate, $z$, in such a manner that the leaden sheet will lie on the insulating-frame $f$. On this zinc plate I place another diaphragm $d$, and upon it another insulating-frame $f$, and so on, closing the pile with a leaden sheet backed by a zinc plate, a polar wire (not shown) being soldered to the said leaden sheet. After a sufficient number of elements have been thus arranged I put on another wooden plate, $w$, which (as also is the first-mentioned wooden plate) is provided with a flange, $w'$. The wooden plates are then drawn toward each other by means of screw-bolts $w^2$ firmly pressing the elements and insulating-frames in such a manner that the cells between the elements are rendered water-tight. These bolts pass in front, in rear, and below the elements, care being taken to locate them a sufficient distance from the elements to avoid a short circuit. The battery thus formed is provided with an outer casing, A'.

B represents the upper chamber, the bottom of which is provided with a series of tubes, C, which extend into the cells constituting the lower chamber, so as to allow the exciting solution to pass from one chamber to the other in the direction of the arrows, as indicated in Fig. 1 of the drawings.

The upper chamber is divided into three compartments by means of foraminous partitions D D', and at one side of said chamber between the partitions there is a capped opening, F, through which to charge the chamber. The space between the foraminous partitions D D' is filled or partially filled with crystals E of the exciting salt—say sulphate of copper—and the battery-chambers are filled with water, so that the solution will stand at the level indicated by the letters $x\ x$ in Figs. 1 and 2, when the battery is in an upright position.

Chamber B is braced by means of rods H extending from bottom to top, as shown. The bottom piece of this chamber is flanged, as at $b'$, the flanges corresponding to those on the wooden plates of the lower chamber, and the two chambers are secured together by means of clamps G, engaging with their flanges, as shown, a strip of suitable packing, as $p$, being inserted between the chambers to insure a tight joint.

In using this battery, when the solution in the cells has become decomposed and lost its effect it may be renewed by inverting the battery for awhile, and then restoring it to its normal position, the solution in the upper chamber supplying that of the waste solution below. When it is desired to put the battery out of operation, all that is necessary is to invert it and leave it in that position, when, there being no solution in the cells, there will be no action on the elements. When the battery is inverted, the salts will be held above the solution by the foraminous partition D'.

Having thus described my invention, what I claim as new, and desire to secure by Letters Patent, is—

1. The combination, with the lower chamber composed of a series of electrodes and intervening partition-frames, forming cells for the exciting solution, secured together in any suitable manner, of the upper chamber provided with foraminous partitions, forming receptacles for the solution and for the salt, and also provided in its bottom with a series of connecting-tubes for engagement with the cells in the lower chamber when the two chambers are secured together, substantially as described, and for the purposes above set forth.

2. In a galvanic battery of the kind hereinabove described, the combination, with a series of elements separated by insulating partition-frames and bound together by wooden plates flanged at their upper ends, the whole constituting the lower chamber, of the upper chamber, partitioned so as to form receptacles for the solution and for the salt, and flanged on its bottom, and suitable clamps for engaging with the flanges on both chambers to bind said chambers firmly together, substantially as specified.

In testimony whereof I hereunto sign my name, in the presence of two subscribing witnesses, this 15th day of June, 1885.

THEODOR ERHARD.

Witnesses:
ALVIN KUNZ,
GOTTLIEB SEINZEN.